United States Patent
Shin et al.

(10) Patent No.: US 9,332,088 B2
(45) Date of Patent: May 3, 2016

(54) SYSTEMS AND METHODS FOR UPDATING COMPUTING PROGRAMS

(71) Applicants: Hyun-sung Shin, Seoul (KR); Seungman Shin, Suwon-si (KR); Insu Choi, Hwaseong-si (KR)

(72) Inventors: Hyun-sung Shin, Seoul (KR); Seungman Shin, Suwon-si (KR); Insu Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 310 days.

(21) Appl. No.: 13/925,122

(22) Filed: Jun. 24, 2013

(65) Prior Publication Data

US 2014/0025729 A1    Jan. 23, 2014

(30) Foreign Application Priority Data

Jul. 19, 2012    (KR) .................. 10-2012-0078837

(51) Int. Cl.
  *G06F 15/16*    (2006.01)
  *H04L 29/06*    (2006.01)
  *H04L 29/08*    (2006.01)

(52) U.S. Cl.
  CPC ............... *H04L 67/42* (2013.01); *H04L 67/34* (2013.01)

(58) Field of Classification Search
  CPC .......................... H04L 51/046; H04L 67/42
  USPC .................................................. 709/202, 203
  See application file for complete search history.

(56) References Cited

U.S. PATENT DOCUMENTS

| 5,928,335 | A | * | 7/1999 | Morita | ................. H04L 51/046 709/203 |
|---|---|---|---|---|---|
| 6,356,933 | B2 | | 3/2002 | Mitchell et al. | |
| 6,813,762 | B1 | | 11/2004 | Plaxton | |
| 7,657,607 | B2 | | 2/2010 | Natarajan | |
| 2005/0108706 | A1 | | 5/2005 | McCain | |
| 2009/0083733 | A1 | | 3/2009 | Chen et al. | |
| 2010/0268842 | A1 | | 10/2010 | Kim et al. | |
| 2011/0252335 | A1 | | 10/2011 | Lloyd et al. | |

FOREIGN PATENT DOCUMENTS

| JP | 2003029996 | 1/2003 |
|---|---|---|
| JP | 2007536634 | 12/2007 |
| JP | 20100231485 | 10/2010 |
| KR | 100936239 B1 | 1/2010 |

* cited by examiner

*Primary Examiner* — Adnan Mirza
(74) *Attorney, Agent, or Firm* — Volentine & Whitt, PLLC

(57) ABSTRACT

A process transmission system comprises a process transmission server and a client device configured to communicate with the process transmission server. The process transmission server receives program request information from the client device, packs a process of a program to generate a process package comprising a central processing unit (CPU) register value associated with the program, and transmits the process package to the client device. The client device transmits program request information to the process transmission server, receives a process package corresponding to the program request information from the process transmission server, and executes a process by performing data processing on the received process package. The data processing comprises storing the process in a main memory device of the client device based on the process package and transmitting the CPU register value to a CPU of the client device.

14 Claims, 11 Drawing Sheets

SYSTEMS AND METHODS FOR UPDATING COMPUTING PROGRAMS

CROSS-REFERENCE TO RELATED APPLICATIONS

This application claims priority under 35 U.S.C §119 to Korean Patent Application No. 10-2012-0078837 filed Jul. 19, 2012, the subject matter of which is hereby incorporated by reference.

BACKGROUND OF THE INVENTION

The inventive concept relates generally to computing programs used by electronic systems or devices, and more particularly, to techniques for updating the computing programs.

A computing program comprises a set of instructions used to control or perform operations in an electronic system or device. For instance, a computing program may comprise an application program, a utility program, an operating system (OS) program, and so on.

During the lifetime of a particular electronic device, its computing programs may need to be updated periodically, e.g., by installing new program code or modifying existing program code. A typical update procedure for such a device comprises steps for acquiring, installing, executing, and loading new program data. This is often accomplished through the use of an install file containing information to control the update procedure.

In many modern electronic devices, computing programs are updated on a relatively frequent basis. Accordingly, the performance of update procedures can have a significant impact on the overall performance of a device. Examples of devices that may perform frequent updates include personal computers, notebook computers, tablet computers, and smart phones, to name but a few.

In view of the potential impact that update procedures may have on the overall performance of some devices, there is a general need to provide update procedures and related operations with efficient performance.

SUMMARY OF THE INVENTION

In one embodiment of the inventive concept, a method of operating a process transmission server comprises packing a process of a program to generate a process package comprising a central processing unit (CPU) register value associated with the program, receiving program request information from a client device, and transmitting the process package to the client device in response to the received program request information.

In another embodiment of the inventive concept, a method of operating a client device comprises transmitting program request information from the client device to a process transmission server, receiving a process package corresponding to the program request information from the process transmission server, wherein the process package comprises a process associated with the program and a CPU register value associated with the program, performing data processing on the processes package to store the process in a main memory device of the client device, and transmit the CPU register value to a CPU of the client device.

In another embodiment of the inventive concept, a process transmission system comprises a process transmission server and a client device configured to communicate with the process transmission server. The process transmission server receives program request information from the client device, packs a process of a program to generate a process package comprising a CPU register value associated with the program, and transmits the process package to the client device. The client device transmits program request information to the process transmission server, receives a process package corresponding to the program request information from the process transmission server, and executes a process by performing data processing on the received process package. The data processing comprises storing the process in a main memory device of the client device based on the process package and transmitting the CPU register value to a CPU of the client device.

These and other embodiments of the inventive concept can potentially improve the performance of program update operations by eliminating a need to install and load a program corresponding to a program package.

BRIEF DESCRIPTION OF THE DRAWINGS

The drawings illustrate selected embodiments of the inventive concept. In the drawings, like reference numbers indicate like features.

DETAILED DESCRIPTION

Figure 1:
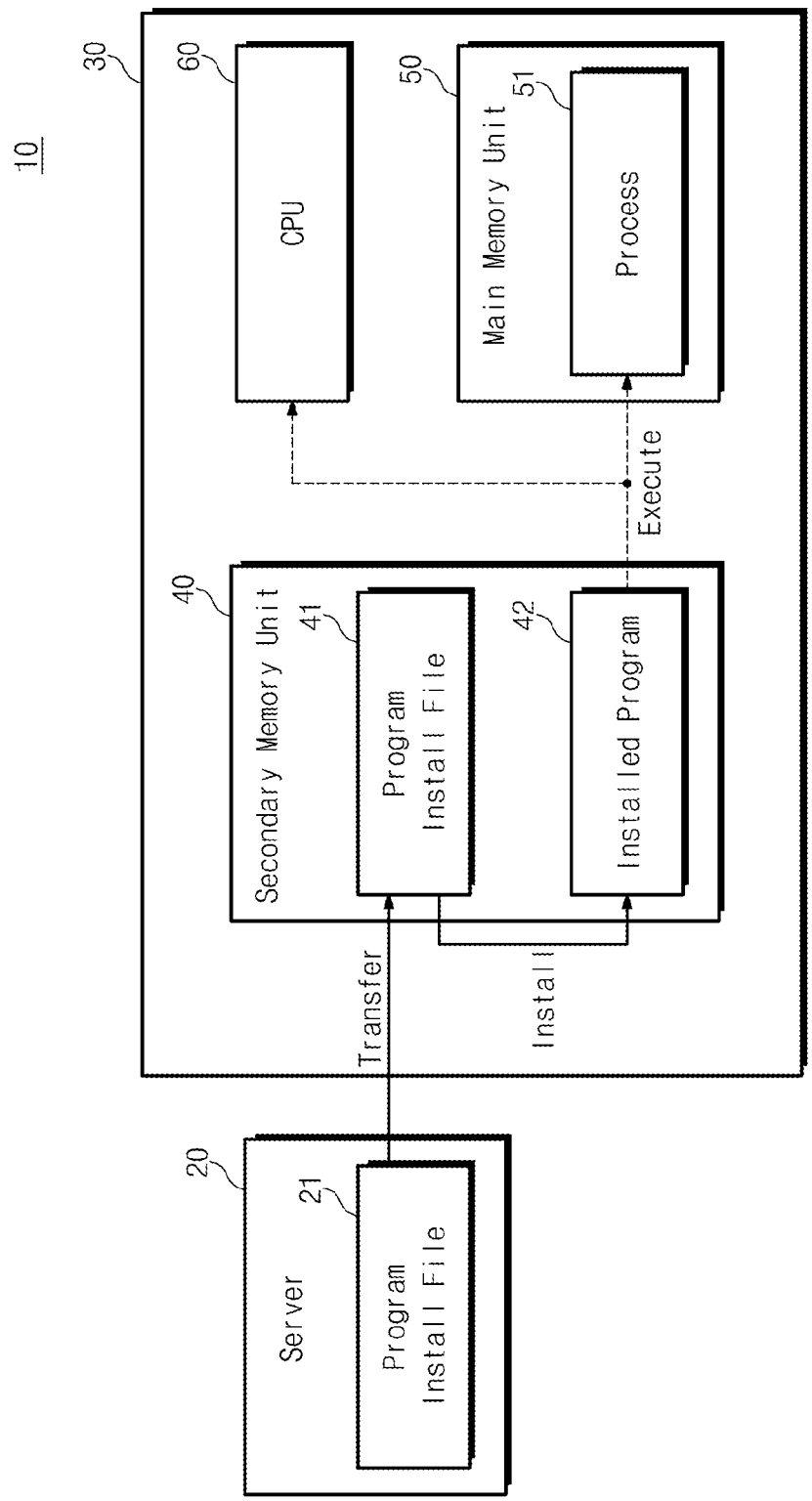
FIG. 1 is a block diagram of a program transmission system according to an embodiment of the inventive concept.

Embodiments of the inventive concept are described below with reference to the accompanying drawings. These embodiments are presented as teaching examples and should not be construed to limit the scope of the inventive concept.

In the description that follows, the terms first, second, third etc. are used to describe various elements, components, regions, layers and/or sections, but these elements, components, regions, layers and/or sections should not be limited by these terms. Rather, these terms are used merely to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the terms "below" and "under" can encompass both an orientation of above and below. The device may be otherwise oriented (rotated 90 degrees or at other orientations) and the spatially relative descriptors used herein interpreted accordingly. In addition, where a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Where an element or layer is referred to as being "on", "connected to", "coupled to", or "adjacent to" another element or layer, it can be directly on, connected, coupled, or adjacent to the other element or layer, or intervening elements or layers may be present. In contrast, where an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or the present specification and will not be interpreted in an idealized or overly formal sense unless expressly so defined herein.

FIG. 1 is a block diagram illustrating a program transmission system 10 according to an embodiment of the inventive concept.

Referring to FIG. 1, program transmission system 10 comprises a server 20 and a client device 30. Server 20 provides a computing program, also referred to as a "program", to client device 30. Server 20 stores a program install file 21 comprising information used to register programs in an OS of client device 30, program data for client device 30, and so on. Server 20 sends program install file 21 to client device 30.

Client device 30 comprises a secondary memory unit 40, a main memory unit 50, and a CPU 60. Client device 30 stores a program install file 41 received from server 20 in secondary memory unit 40. Client device 30 installs program install file 41 stored in secondary memory unit 40 and stores installed program 42 in secondary memory device 40. Installation of the program typically comprises adding and registering the program in client device 30 and decompressing a compressed version of program install file 41.

Client device 30 executes installed program 42. Where installed program 42 is executed, client device 30 stores a process of the installed program in main memory device 50, and it transfers a CPU register value associated with installed program 42 to CPU 60. CPU 60 executes a program based on process 51 and the input CPU register value. The process typically corresponds to a program in execution. For instance, the process may comprise a data structure stored in main memory device 50 during execution of the program.

Figure 2:
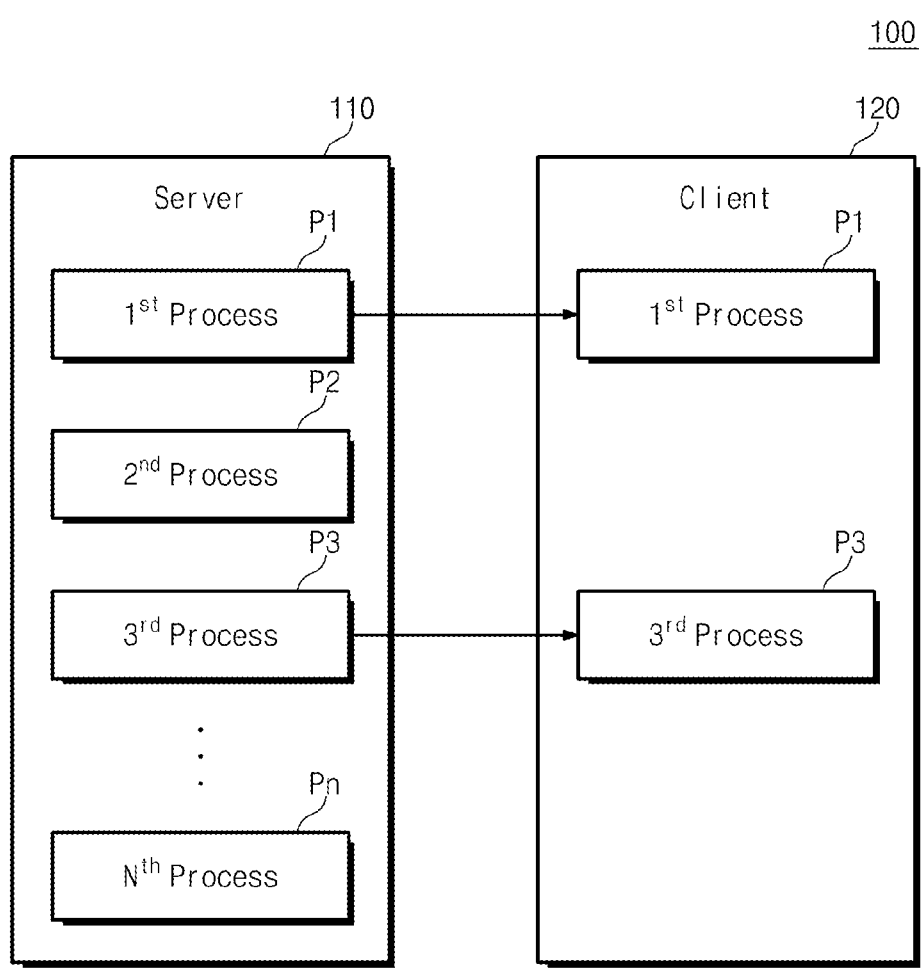
FIG. 2 is a block diagram of a program transmission system according to another embodiment of the inventive concept.

FIG. 2 is a block diagram of a process transmission system 100 according to an embodiment of the inventive concept.

Referring to FIG. 2, process transmission system 100 comprises a program transmission server 110 and a client device 120.

Process transmission server 110 comprises a plurality of process packages P1 to Pn. In some embodiments, process packages P1 to Pn correspond to a plurality of operating systems or a plurality of hardware configurations or platforms (e.g., different devices such as a personal computer, a notebook computer, a smart phone, a tablet PC, etc.). In some embodiments, process packages P1 to Pn are stored in one of a secondary memory device and a main memory device of process transmission server 110 (See, e.g., FIG. 3).

Client device 120 receives process packages P1 and P3 from process transmission server 110. In some embodiments, process packages P1 and P3 are process packages selected by process transmission server 110 according to program request information of client device 120. Process packages P1 and P3 may be process packages corresponding to OS and hardware of client device 120.

Client device 120 executes process packages P1 and P3 without installing and loading. Examples of a process package executing operation of client device 120 are described in further detail with reference to FIGS. 6 and 7.

Figure 3:
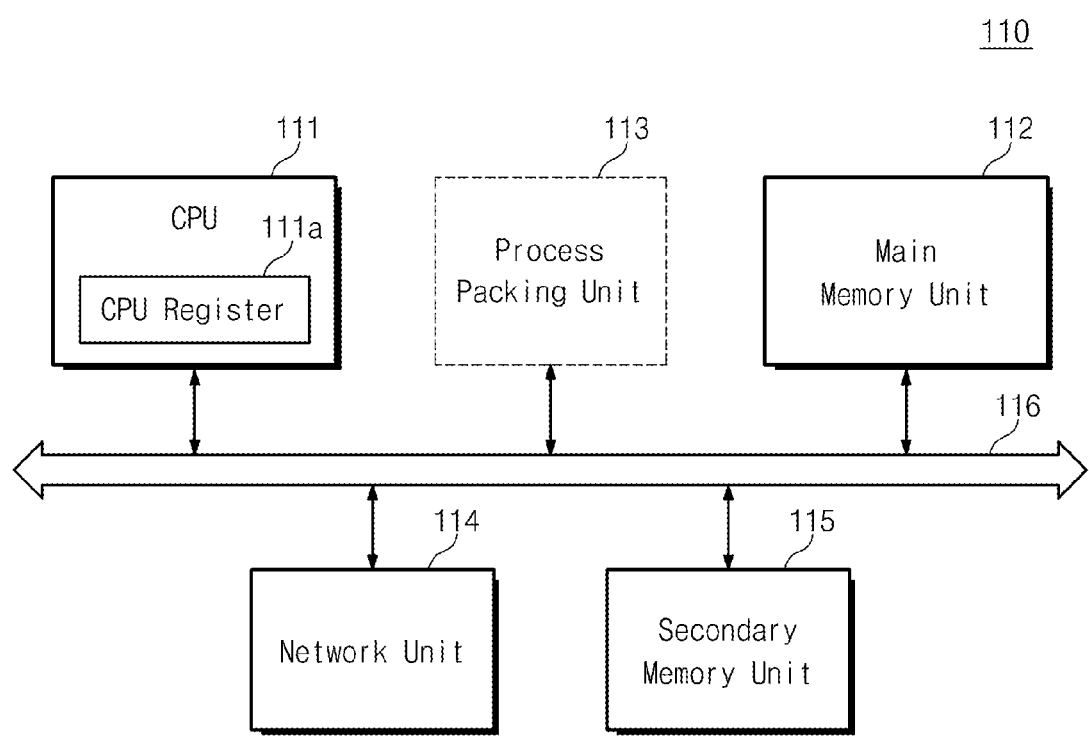
FIG. 3 is a block diagram of a process transmission server illustrated in FIG. 2 according to an embodiment of the inventive concept.

FIG. 3 is a block diagram illustrating an example of process transmission server 110 in FIG. 2, according to an embodiment of the inventive concept.

Referring to FIG. 3, process transmission server 110 comprises a CPU 111, a main memory device 112, a process packing unit 113, a network unit 114, a secondary memory device 115, and a system bus 116.

CPU 111 performs analysis and calculation on a command input by a user, and it outputs a result based on the analysis and calculation. CPU 111 comprises a CPU register 111a. CPU register 111a may be a small data storage device, for example. CPU register 111a stores data to be calculated by CPU 111 or data generated by calculation of CPU 111. CPU 111 typically performs calculation based on data stored in CPU register 111a, referred to as a CPU register value. A CPU register value stored in CPU register 111a comprises values associated with registers (e.g., a general purpose register, a segment register, a pointer register, an index register, etc.).

Main memory device 112 stores a plurality of processes or a plurality of process packages. In some embodiments, main memory device 112 comprises a nonvolatile RAM, a volatile RAM, or a volatile RAM including an internal power supply device.

Process packing unit 113 generates a process package by packing a process based on a CPU register value and information associated with a plurality of operating systems and a plurality of hardware configurations or units. The process package typically comprises a circumstance variable, program information, a register value, program data, a program code, and a CPU register value. Examples of the process package are described in further detail with reference to FIG. 5. In various alternative embodiments, process packing unit 113 can be implemented using a software structure and/or a hardware structure.

Network unit 114 transfers the generated process package through communication with client devices. Network unit 114 also receives information from client devices.

Secondary memory device 115 stores information of client devices. In some embodiments, secondary memory device 115 stores a plurality of process packages. A plurality of process packages corresponds to a plurality of operating systems or a plurality of hardware. Secondary memory device 115 can comprise, for instance, a hard disk drive (HDD) or a solid state drive (SSD). System bus 116 provides a channel for interconnecting components of process transmission server 110.

Figure 4:
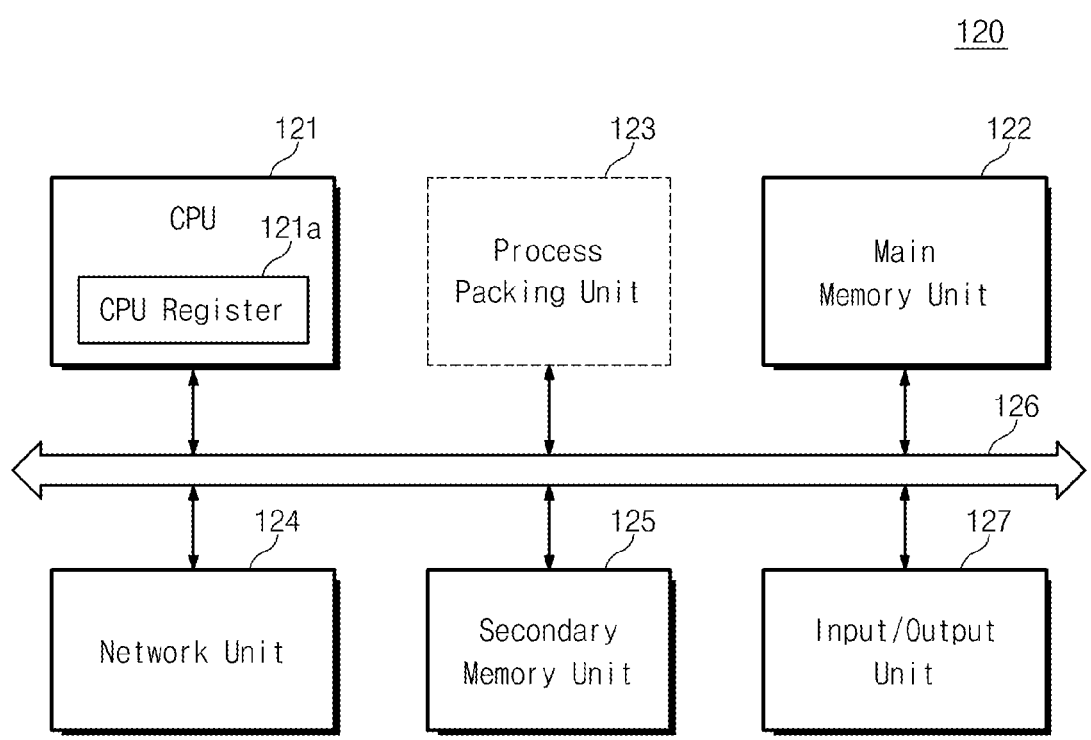
FIG. 4 is a block diagram of a client device illustrated in FIG. 2 according to an embodiment of the inventive concept.

FIG. 4 is a block diagram illustrating an example of client device 120 of FIG. 2, according to an embodiment of the inventive concept.

Referring to FIG. 4, client device 120 comprises a CPU 121, a main memory device 122, a data processing unit 123, a network unit 124, a secondary memory device 125, a system bus 126, and an input/output interface 127.

CPU 121 comprises a CPU register 121a. CPU register 121a may be a small data storage device, for example. Main memory device 122 stores a process. In some embodiments, main memory device 122 comprises a nonvolatile RAM, a volatile RAM, or a volatile RAM including an internal power supply device, for example.

Data processing unit 123 performs processes based on a process package received from a process transmission server 110. For example, data processing unit 123 may register a process in an operating system of client device 120 using information associated with a circumstance variable, a registry value, and a program included in the received process package. Data processing unit 123 stores a program code and data included in the process package in main memory device 122. Data processing unit 123 assigns a heap area and a stack area of main memory device 122 based on heap and stack information included in the process package. A data processing method of data processing unit 123 will be more fully described with reference to FIGS. 6 and 7.

Network unit 124 receives a process package through communication with a server 110. Network unit 124 sends program request information to server 110. Secondary memory device 125 stores data (e.g., a text file, an image file, etc.) generated during execution of a process. In some embodiments, data stored in secondary memory device 125 is transferred to main memory device 122. System bus 126 provides a channel for interconnecting components of client device 120.

Input/output interface 127 outputs a result of a process executed by CPU 121 or receives data needed to execute a process. In some embodiments, input/output interface 127 comprises one or more of a touch screen, a keyboard, a mouse, and a monitor, for example.

Figure 5:
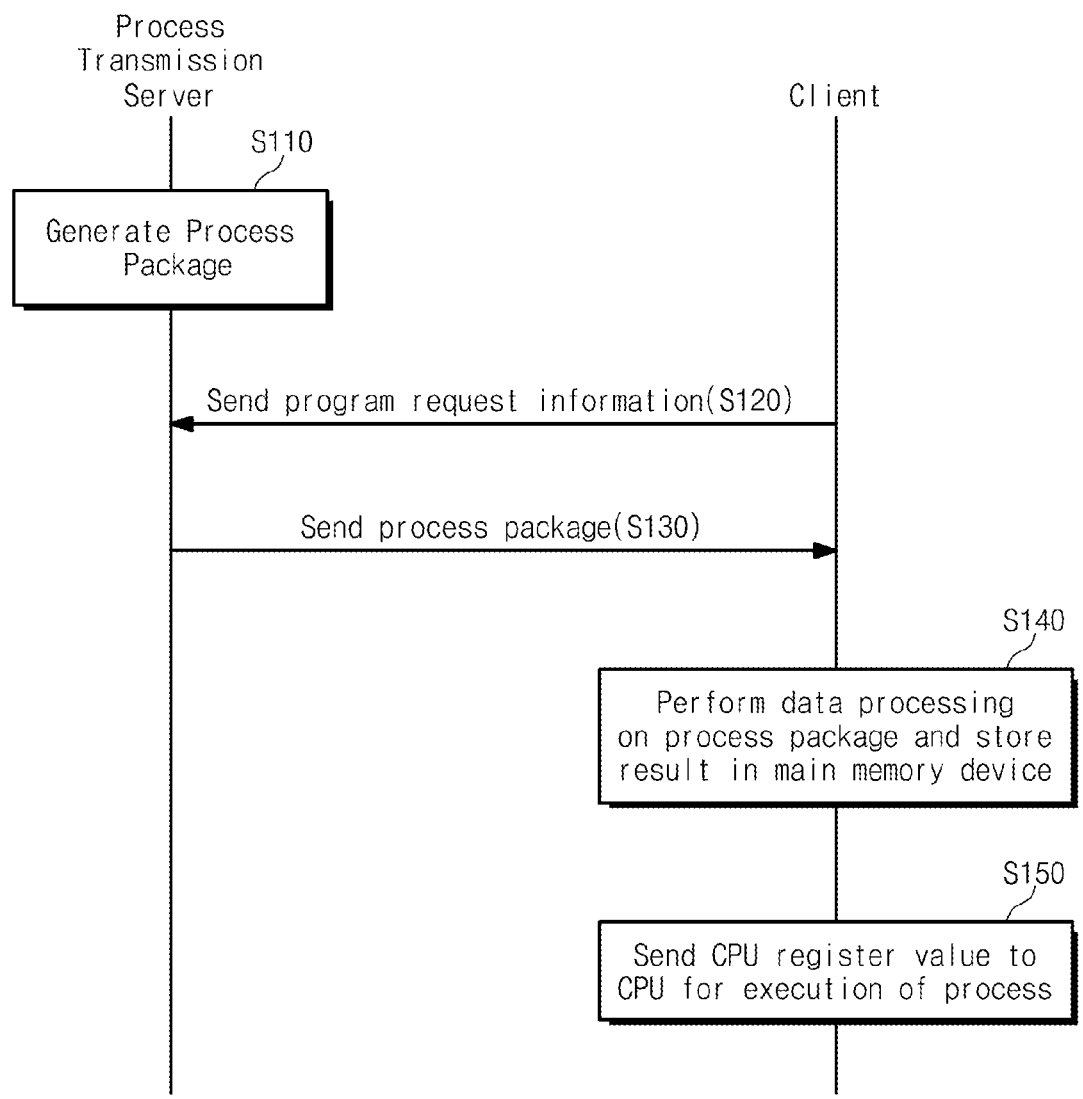
FIG. 5 is a flowchart illustrating a process transmission method according to an embodiment of the inventive concept.

FIG. 5 is a flowchart illustrating a process transmission method according to an embodiment of the inventive concept. For convenience, the method of FIG. 5 will be described with reference to process transmission system 100 of FIG. 2.

Referring to FIG. 5, in operation S110, process transmission server 110 packs a process to generate a process package. For example, process transmission server 110 may generate a process package comprising a CPU register value associated with a program. In some embodiments, process transmission server 110 generates a plurality of process packages corresponding to a plurality of operating systems or a plurality of hardware. The hardware comprises various computing devices such as a personal computer, a notebook computer, a smart phone, a television, a tablet PC, and so on.

In operation S120, client device 120 sends program request information to process transmission server 110. In some embodiments, the program request information comprises OS information or hardware information of client device 120. In some embodiments, the program request information comprises mapping information of a main memory device 122.

In operation S130, process transmission server 110 transfers a process package based on the input program request information. For example, the program request information may include request information on a first program. In this case, process transmission server 110 sends a process package of the first program to client device 120 in response to the program request information.

In some embodiments, if the OS or hardware information of client device 120 is included in the program request information, process transmission server 110 selects a process package corresponding to the OS or hardware information of client device 120 included in the program request information to transfer it to client device 120. Where mapping information of main memory device 122 of client device 120 is included in the program request information, process transmission server 110 may send assignment area information of a process package together based on the input process request information.

In operation S140, client device 120 performs data processing on the input process package to store a result at main memory device 122. An more detailed example of this operation is described with reference to FIGS. 6 and 7.

In operation S150, client device 120 executes a process produced by operation S140. For example, client device 120 may provide a CPU of client device 120 with a CPU register value stored in main memory device 122 in the data process operation, and CPU 121 may execute the process based on the input CPU register value.

Figure 6:
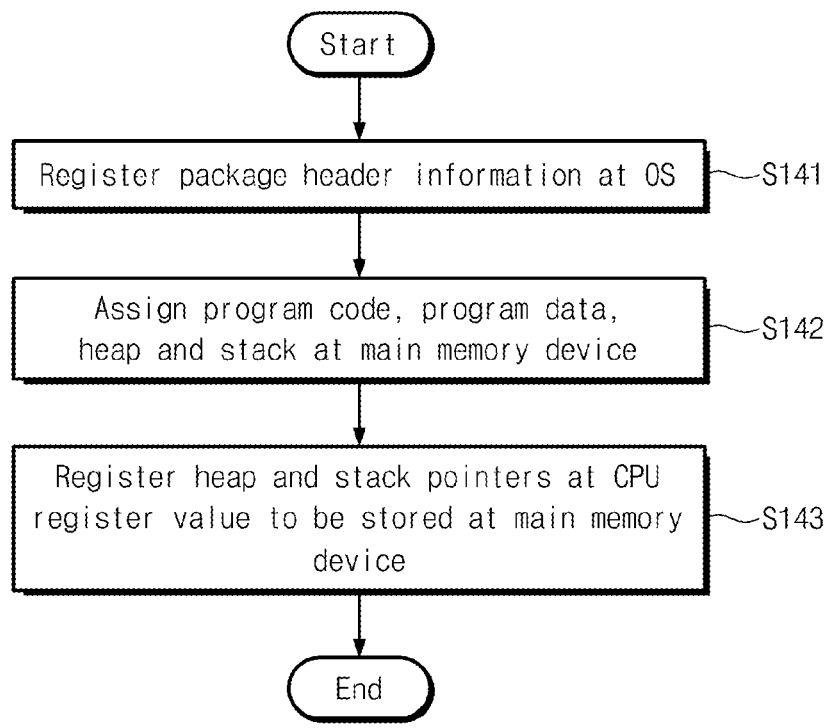
FIG. 6 is a flowchart illustrating an operation S140 in the method of FIG. 5 according to an embodiment of the inventive concept.
Figure 7:
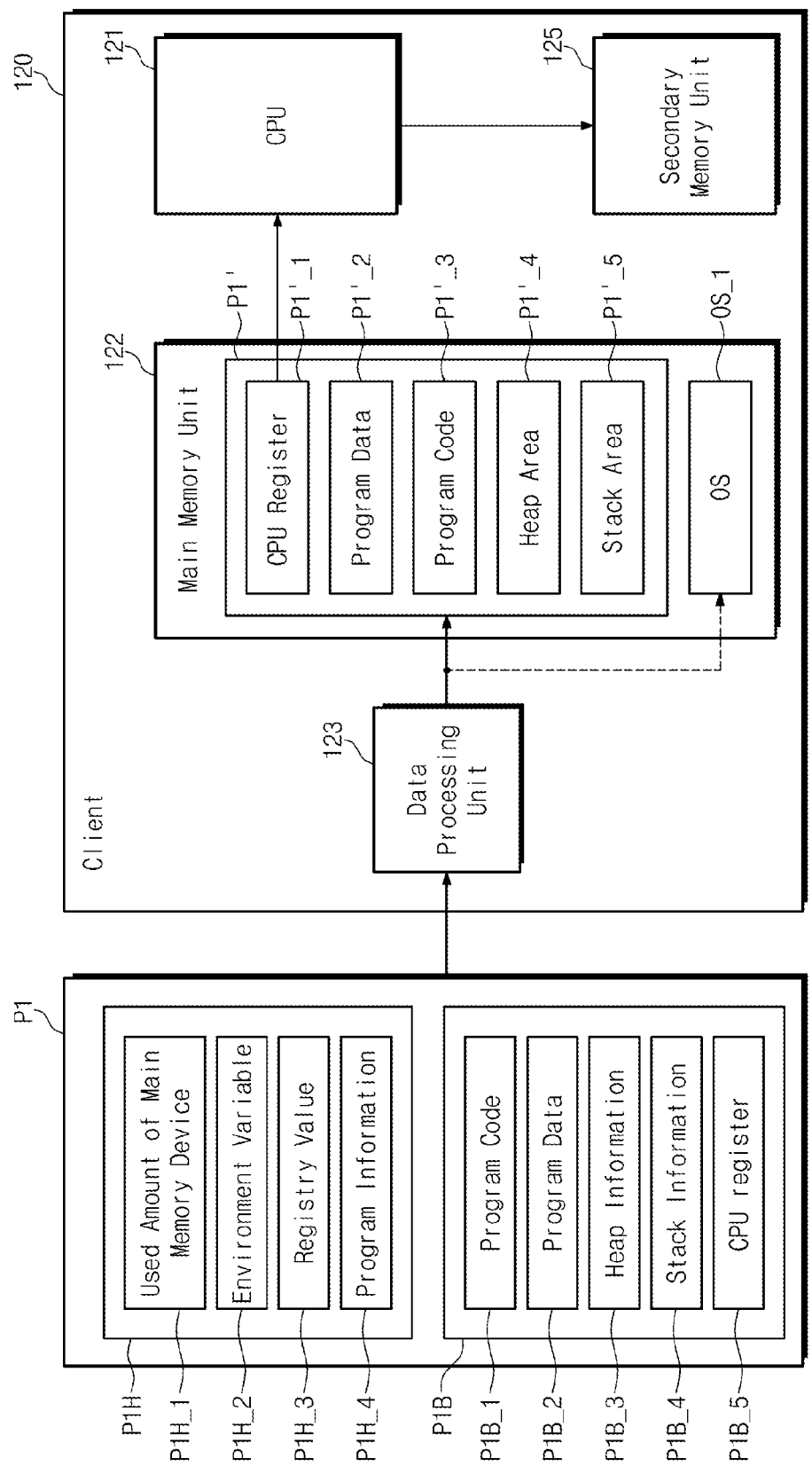
FIG. 7 is a block diagram of a system implementing the method of FIG. 6 according to an embodiment of the inventive concept.

FIG. 6 is a flowchart illustrating an example of operation S140 in FIG. 5, according to an embodiment of the inventive concept. FIG. 7 is a block diagram for describing the flowchart of FIG. 6, according to an embodiment of the inventive concept. In the examples described in relation to FIGS. 6 and 7, data processing unit 123 is formed of a discrete block. However, data processing unit 123 can be a program or a device included in a CPU 121.

Referring to FIGS. 6 and 7, in operation S141, data processing unit 123 of client device 120 registers a process in an operating system OS1 of the client device based on a package header P1H of a process package P1. Package header P1H comprises a used amount of a main memory device P1H_1, a circumstance variable P1H_2, a registry value P1H_3, and program information P1H_4. The used amount of a main memory device P1H_1 may indicate information associated with a total used amount needed to execute a process. Circumstance variable P1H_2 and registry value P1H_3 indicate information for driving a process. Program information P1H_4 indicates information for registering a process at operating system OS_1.

In operation S142, data processing unit 123 stores program data P1'_2 and a program code P1'_3 in main memory device 122 based on a package body P1B of process package P1. Also, data processing unit 123 assigns a heap area P1'_4 and a stack area P1'_5 of main memory device 122 based on a package body P1B of process package P1. For example, package body P1B comprises a program code P1B_1, program data P1B_2, heap information P1B_3, and stack information P1B_4. Data processing unit 123 may store program code P1B_1 and program data P1B_2 at main memory device 122. Data processing unit 123 typically assigns the heap and stack areas P1'_4 and P1'_5 of main memory device 122 based on the heap and stack information P1B_3 and P1B_4. In some embodiments, data processing unit 123 stores program data P1'_2 and program code P1'_3 in an area capable of storing based on mapping information of main memory device 122, and may assign heap area P1'_4 and stack area P1'_5 of main memory device 122 based on mapping information of main memory device 122.

In operation S143, data processing unit 123 stores pointers in CPU register value P1B_5 based on the assigned heap and stack areas P1'_4 and P1'_5. The pointers typically comprise start addresses of the heap and stack areas P1'_4 and P1'_5. Data processing unit 123 stores CPU register value P1B_5, in which pointers are stored, in main memory device 122. In some embodiments, where client device 120 executes a process P1', CPU register P1'_1 sends a CPU register value to CPU 121. CPU 121 may execute process P1' based on the CPU register value.

Client device 120 comprises a secondary memory device 125. Secondary memory device 125 stores data generated according to execution of process P1'. Process P1' may be, for example, a word processor, and CPU 121 may store document data generated by execution of process P1' in secondary memory device 125.

In the above examples, process transmission server 110 may send a process package P1 to client device 120, and client device 120 may execute a program based on input process package P1 without installing and loading.

Figure 8:
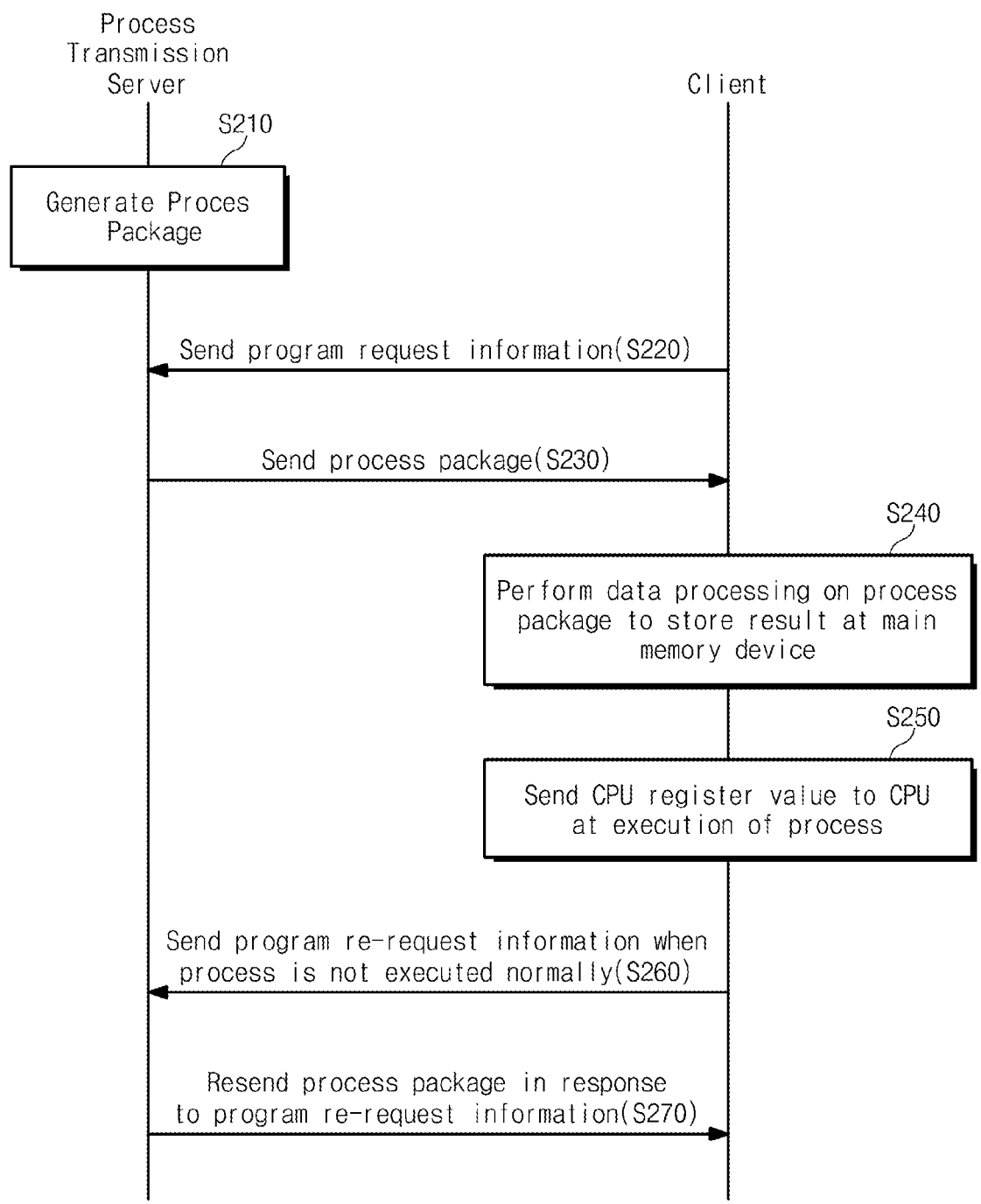
FIG. 8 is a flowchart illustrating a process transmission method according to another embodiment of the inventive concept.

FIG. 8 is a flowchart illustrating a process transmission method according to another embodiment of the inventive concept.

Referring to FIGS. 5 and 8, operations S210 to S250 of FIG. 8 may be substantially the same as operations S110 to S150, and a description thereof is thus omitted.

In operation S260, client device 120 determines whether process P1' is executed normally. Where process P1' is abnormally executed, client device 120 sends program re-request information to server 110.

In operation S270, server 110 resends process package P1 in response to the program re-request information. In some embodiments, client device 120 performs operations S240 and S250 based on process package P1 input according to the program re-request information. Thus, client device 120 may executes a program based on process package P1 provided from process transmission server 110, without installing and loading.

Figure 9:
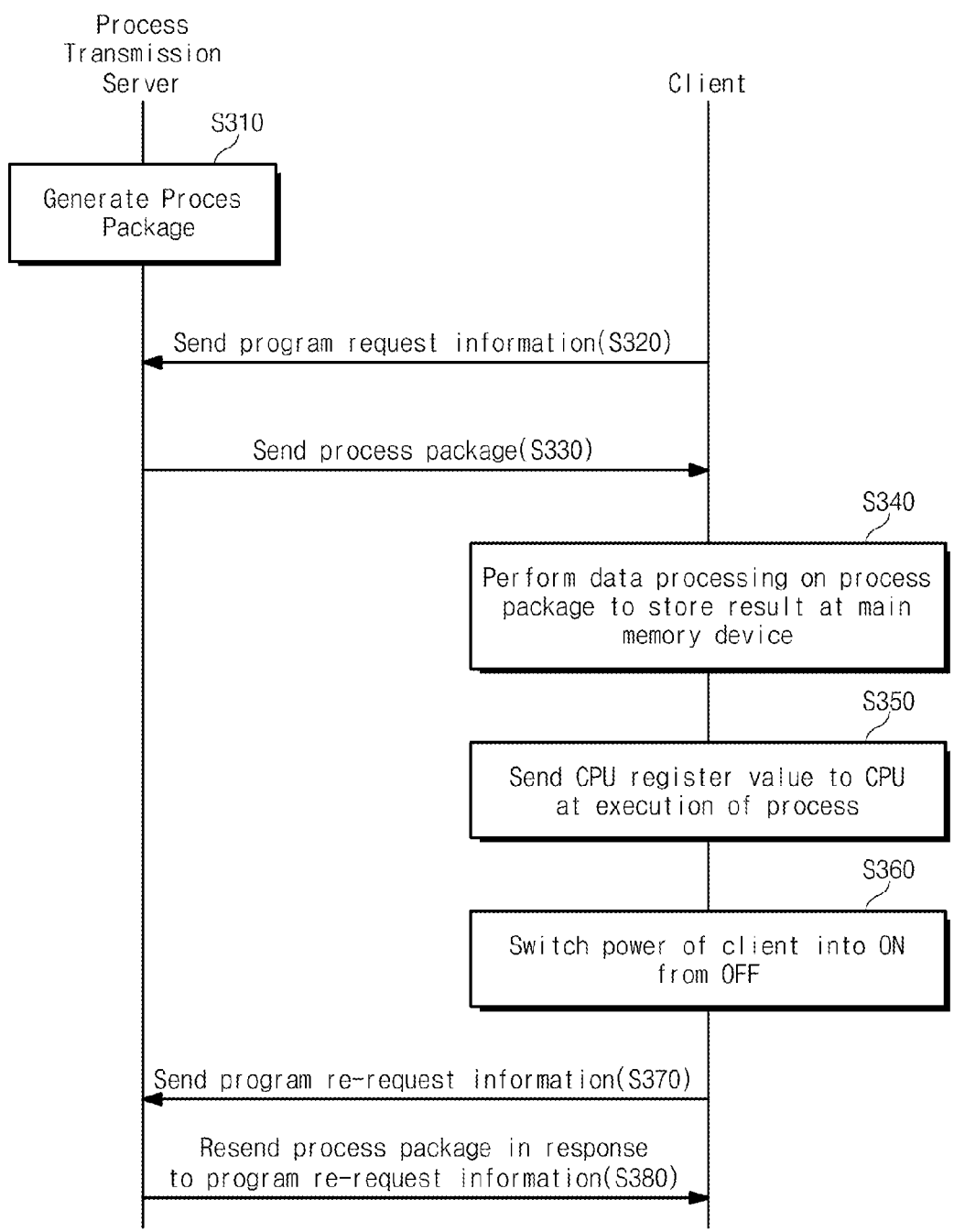
FIG. 9 is a flowchart illustrating a process transmission method according to still another embodiment of the inventive concept.

FIG. 9 is a flowchart illustrating a process transmission method according to still another embodiment of the inventive concept. In FIG. 9, a main memory device 122 of client device 120 may be a volatile RAM.

Referring to FIGS. 5 and 9, operations S310 to S350 in FIG. 9 may be substantially the same as operations S110 to S150, and a description thereof is thus omitted.

In operation S360, client device 120 is switched into a power-on state from a power-off state. Because main memory device 122 of client device 120 is a volatile memory, data of main memory device 122 may be lost.

In operation S370, client device 120 sends program re-request information to process transmission server 110. In some embodiments, the program re-request information comprises power information of client device 120.

In operation S380, process transmission server 110 resends previously transferred process packages to client device 120. For example, process transmission server 110 may resend process packages based on information on process packages transferred to client device 120. Client device 120 performs operations S340 and S350 based on the resent process packages. Thus, process transmission server 110 may provide client device 120 with a process package P1 not necessitating installing and loading.

Figure 10:
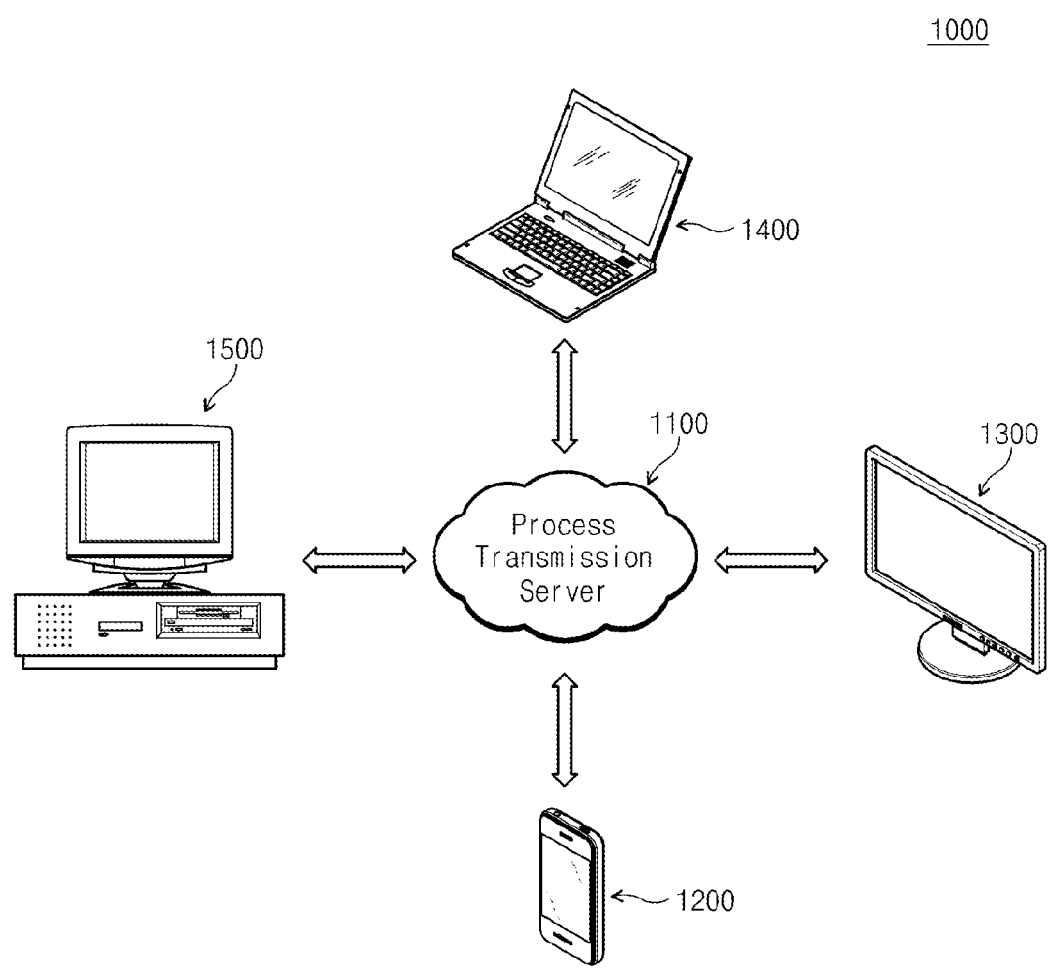
FIG. 10 is a diagram illustrating one form of process transmission system according to an embodiment of the inventive concept.

FIG. 10 is a diagram illustrating one form of process transmission system according to an embodiment of the inventive concept. In some embodiments, a process transmission system 1000 may be implemented in a Local Area Network (LAN). However, the inventive concept is not limited thereto. Process transmission system 1000 can be a Wide Area Network (WAN).

Referring to FIG. 10, process transmission system 1000 comprises a process transmission server 1100, a smart phone 1200, a television 1300, a notebook computer 1400, and a personal computer 1500. Smart phone 1200, television 1300, notebook computer 1400, and the personal computer may be client devices. Below, smart phone 1200, television 1300, notebook computer 1400, and the personal computer may be referred to as client devices. The client devices execute programs. Process transmission system 1000 and the client devices perform wireless or wired communications. Wireless communications may comprise, for instance, Long Term Evolution (LTE), Frequency Division Multiple Access (FDMA), Global System for Mobile communication (GSM), Code Division Multiple Access (CDMA), Wideband CDMA (W-CDMA), High Speed Downlink Packet Access (HSDPA), CDMA2000, Ultra Mobile Broadband (UMB), Wireless Fidelity (WI-FI), Wireless Broadband Internet (Wibro), Radio Frequency Identification (Bluetooth, RFID), and so on.

Process transmission server 1100 comprises a plurality of process packages. The process packages may correspond to a plurality of operating systems, a plurality of hardware, and a plurality of programs. The client devices may receive process packages from process transmission server 1100 to execute the programs without installing and loading.

In some embodiments, other devices (not shown) (e.g., a tablet PC, program-executable computing devices, etc.) may be also connected with process transmission server 1100 to receive a process package corresponding to an operating system or hardware of each device.

Figure 11:
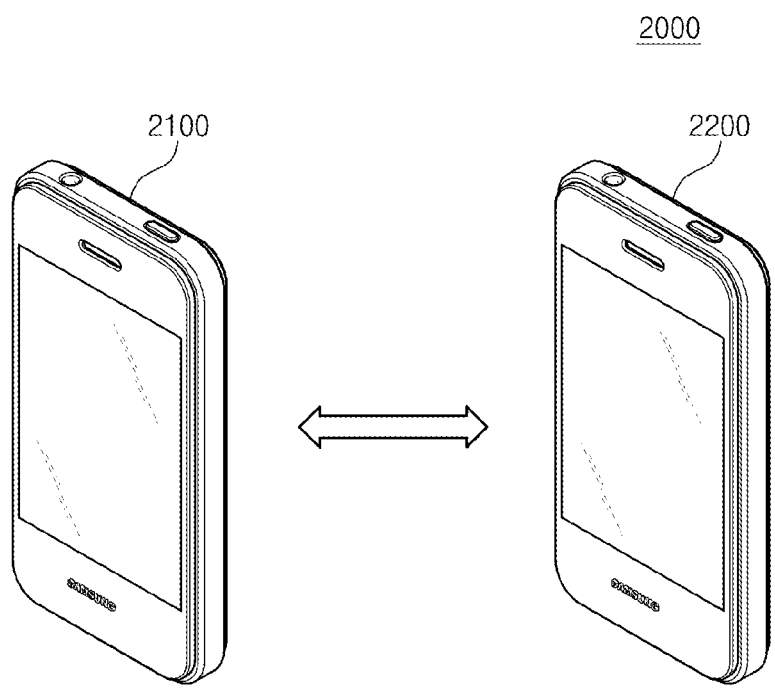
FIG. 11 is a diagram illustrating another form of process transmission system according to an embodiment of the inventive concept.

FIG. 11 is a diagram illustrating another form of process transmission system according to an embodiment of the inventive concept.

Referring to FIG. 11, a process transmission system 2000 comprises a first handheld terminal 2100 and a second handheld terminal 2200. The first and second handheld terminals 2100 and 2200 may perform wire or wireless communications. Wireless communications may include, for instance, LTE, FDMA, GSM, CDMA, W-CDMA, HSDPA, CDMA2000, UMB, WI-FI, Wibro, Bluetooth, RFID, and so on.

First and second handheld terminals 2100 and 2200 may be the same types of devices. For example, the first and second handheld terminals 2100 and 2200 may be driven by the same operating system and have the same hardware configuration. Each of the first and second handheld terminals 2100 and 2200 may include a plurality of process packages. Process packages included in first handheld terminal 2100 may be different from process packages included in second handheld terminal 2200.

First handheld terminal 2100 requests a first program included in second handheld terminal 2200. In this case, second handheld terminal 2200 may transfer a process package of the first program to first handheld terminal 2100. First handheld terminal 2100 may execute the first program based on a data processing method described with reference to FIGS. 6 and 7.

Second handheld terminal 2200 may request a second program included in first handheld terminal 2100. In this case, first handheld terminal 2100 may transfer a process package of the second program to second handheld terminal 2200. Second handheld terminal 2200 may execute the second program based on a data processing method described with reference to FIGS. 6 and 7. That is, the first and second handheld terminals 2100 and 2200 may share different process packages.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A method of operating a process transmission server, comprising:
    packing a process of a program to generate a process package comprising a central processing unit (CPU) register value associated with the program, wherein the process package is executable by a client device by registering the process in an operating system (OS) of the client device; and thereafter,
    receiving program request information from the client device; and
    transmitting the process package to the client device in response to the received program request information,
    wherein the program request information comprises information identifying the operating system (OS) and a hardware configuration for the client device,
    wherein the packing a process of a program to generate a process package comprising a CPU register value associated with the program comprises generating a plurality of process packages, each one of the plurality of process packages corresponding to at least one of a different operating system (OS) and a different hardware configuration, and
    wherein the sending the process package to the client device in response to the program request information comprises selecting a process package from among the plurality of process packages and sending the selected process package to the client device in response to the program request information.

2. The method of claim 1, wherein the process transmission server and the client device have a common operating system (OS) and hardware configuration.

3. The method of claim 1, wherein the process package further comprises a circumstance variable, information of the program, a registry value, code of the program, and data of the program.

4. The method of claim 1, wherein the CPU register value comprises a pointer to an address of a heap or stack area in the client device.

5. A method of operating a client device, comprising:
    transmitting program request information from the client device to a process transmission server;
    receiving a process package corresponding to the program request information from the process transmission server, wherein the process package comprises a process associated with the program and a central processing unit (CPU) register value associated with the program and is executable by the client device by registering the process in an operating system (OS) of the client device;
    performing data processing on the process package to store the process in a main memory device of the client device, and transmit the CPU register value to a CPU of the client device;
    upon determining that data processing has been performed on the process package and that the process is not executable by the client device, transmitting program re-request information to the process transmission server;
    receiving another process package from the process transmission server in response to the program re-request information, wherein the another process package comprises another process associated with the program and another CPU register value associated with the program, the another process package being executable by the client device by registering the process in the OS of the client; and
    performing data processing on the another process package to store the another process in a main memory device of the client device, and transmit the another CPU register value to the CPU of the client device.

6. The method of claim 5, wherein the program request information comprises information identifying the operating system (OS) and a hardware configuration for the client device.

7. The method of claim 5, further comprising transmitting the received process package to a handheld terminal having a common operating system (OS) and hardware configuration with the client device.

8. The method of claim 5, wherein the process package further comprises a circumstance variable, information of the program, a registry value, code of the program, and data of the program.

9. The method of claim 5, wherein the CPU register value comprises a pointer to an address in a heap or stack area of the main memory device.

10. A process transmission system, comprising:
    a process transmission server; and
    a client device configured to communicate with the process transmission server,
    wherein the process transmission server;
        packs a plurality of process packages, each process package in the plurality of process packages including a central processing unit (CPU) register value associated with a program, wherein the program is executable by a client device by registering the process in an operating system (OS) of the client device, and
        receives program request information from the client device,
        selects a process package from the plurality of process packages in response to the program request information, and
        transmits the selected process package to the client device; and
    the client device;
        receives the selected process package from the process transmission server,
        executes a process by performing data processing on the received process package, wherein the data processing comprises storing the process in a main memory device of the client device based on the process package and transmitting the CPU register value to a CPU of the client device,.

wherein the main memory device of the client device is a nonvolatile random access memory (RAM) or a volatile RAM comprising an internal power supply device, and wherein the main memory device of the client device stores a plurality of processes corresponding to different operating systems (OSs) or hardware configurations.

11. The process transmission system of claim 10, wherein the process transmission server comprise a memory that stores the plurality of process packages, and each one of the plurality of process packages corresponds to at least one of a plurality of different programs, a plurality of different operating systems (OSs), and a plurality of different hardware configurations.

12. The process transmission system of claim 11, wherein the program request information comprises information identifying the operating system (OS) and a hardware configuration for the client device.

13. The process transmission system of claim 10, wherein the selected process package further comprises a circumstance variable, information of the program, a registry value, code of the program, and data of the program.

14. The process transmission system of claim 10, wherein the CPU register value comprises a pointer to an address of a heap or stack area in the client device.

* * * * *